United States Patent [19]

Horiuchi et al.

[11] 4,171,506

[45] Oct. 16, 1979

[54] CONTROL APPARATUS FOR AN ELECTRIC CAR

[75] Inventors: Michimasa Horiuchi; Hiroshi Narita; Takashi Tsuboi, all of Ibaraki, Japan

[73] Assignee: Hitachi, Ltd., Japan

[21] Appl. No.: 813,668

[22] Filed: Jul. 7, 1977

[30] Foreign Application Priority Data

Jul. 14, 1976 [JP] Japan .................................. 51-82948

[51] Int. Cl.$^2$ ............................................. H02P 5/06
[52] U.S. Cl. .................................... 318/338; 318/247; 318/353; 318/426
[58] Field of Search ............... 318/139, 247, 426, 351, 318/353, 338, 405, 406

[56] References Cited

U.S. PATENT DOCUMENTS

| | | | |
|---|---|---|---|
| 3,466,522 | 9/1969 | Cushing, Jr. | 318/338 |
| 3,697,852 | 4/1971 | Gerbitz | 363/21 |
| 3,755,724 | 8/1973 | Anderson | 318/247 |

Primary Examiner—Gene Z. Rubinson
Assistant Examiner—M. K. Mutter
Attorney, Agent, or Firm—Craig and Antonelli

[57] ABSTRACT

In an electric car, wherein the powering drive and the braking drive are executed by on-off controlling a current through a d. c. motor by means of a chopper, when the electric car is below a predetermined speed, a field coil of the d. c. motor is put into a series winding connection so as to carry out full field control, and when the car is above the predetermined speed, the field coil of the d. c. motor is changed-over to a shunt winding connection so as to carry out weak field control.

The duty cycle of the chopper is controlled with the running state of the electric car taken into consideration in order that the field current at the time when the series winding connection has been changed-over to the shunt winding connection may become substantially equal to a value before the change-over, whereby the transient change of the current between before and after the change-over of the field coil is suppressed.

17 Claims, 14 Drawing Figures

CONTROL APPARATUS FOR AN ELECTRIC CAR

BACKGROUND OF THE INVENTION

This invention relates to control apparatus for an electric car. More particularly, it relates to an electric car which is field-controlled by a chopper in such a way that, at powering drive of the electric car, the field coil of a d.c. motor is changed-over from a series winding connection to a shunt winding connection, while at braking drive, the field coil is changed-over from the shunt winding connection to the series winding connection.

As seen, for example, in German literature 'ELEK-TRISCHE BAHNEN,' Heft 12 (Jarhgang 36 1965), page 289, Bild 19–Bild 21, the control apparatus for an electric car of this type can carry out substantially continuously from full field control to weak field control at powering drive and from weak field control to full field control at regenerative braking drive by one set of choppers without changing-over the main circuit of the motor. Another merit is that the change-over from the powering drive to the regenerative braking is very simple.

The control circuit for the electric car at the powering drive is such that, below a rated speed, the d. c. motor is made a series motor by connecting the field coil and armature thereof in series, the chopper being connected in series with the d. c. motor so as to execute full field control by the on-off control of the chopper. When the duty cycle of the chopper has become the maximum value and the electric car has reached substantially the rated speed, the d. c. motor is made a shunt motor in order to render the speed of the electric car still higher. In this case, the field coil is connected in series with the chopper, and the duty cycle of the chopper is controlled so that the field current may become small as compared with the armature current. Thus, weak field control is executed.

On the other hand, at regenerative braking, conversely to the case of the powering drive, the d. c. motor is changed-over from the shunt winding connection to the series winding connection, and the weak field control followed by the full field control is carried out by the on-off control of the chopper.

Since, however, the change-over between the series winding and the shunt winding at the powering drive or the regenerative braking drive is performed upon condition that the duty cycle of the chopper has become a maximum value, the transient change of the field current at the change-over is large. For this reason, a sharp fluctuation in the torque occurs, which results in such problem that a comfortable ride is ruined.

SUMMARY OF THE INVENTION

An object of this invention is to provide control apparatus for an electric car in which a transient current change occurring at the change-over between the series winding connection and the shunt winding connection of the field coil of a d. c. motor is suppressed.

To accomplish the above object, this invention controls the duty cycle of a chopper with the running state of the electric car taken into consideration in order that the field current at the time when the field coil of the d.c. motor has been changed-over may become equal to a value before the change-over.

DESCRIPTION OF THE PREFERRED EMBODIMENTS

Figure 1:
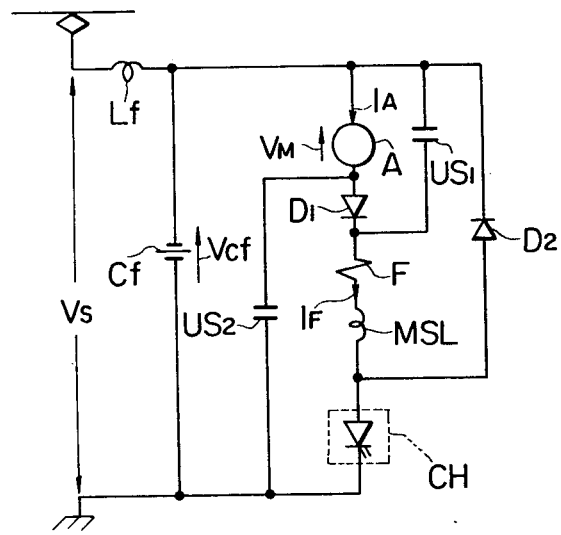
FIG. 1 is a diagram showing the main circuit arrangement of an electric car controlled by a chopper to which this invention is applied.

FIG. 1 is a diagram showing the main circuit arrangement of an electric car to which this invention is applied. According to the circuit arrangement, below a rated speed, full field control is performed as a series motor in which a field coil F of a d. c. motor is connected in series with an armature A, while above the rated speed, weak field control is performed as a shunt motor in which the field coil F is connected in parallel with the armature A.

In FIG. 1, a reactor $L_f$ and a capacitor $C_f$ constitute a power source filter which smooths a current flowing through an overhead line. In parallel with the capacitor $C_f$, there is connected a series circuit which consists of the armature A of the motor, a rectifier $D_1$ for preventing short-circuiting of a motor voltage $V_M$ when a switch $US_1$ is closed, the field coil F of the motor, a reactor MSL for smoothing an armature current $I_A$ (equal to a field current $I_F$ of the series motor), and a chopper CH. Switches $US_1$ and $US_2$ serve to change-over the field coil F of the motor between the series winding and the shunt winding. When both the switches $US_1$ and $US_2$ are open, the series motor circuit is constructed, and when both are closed, the shunt motor circuit is constructed. Shown at $D_2$ is a rectifier which freewheels the energy of the smoothing reactor MSL when the chopper CH is "off." With such circuit, from the time of starting of the electric car to the arrival at substantially the rated speed, the switches $US_1$ and $US_2$ are held open to construct the series motor, and full field control at the powering drive by the chopper CH is executed. When the duty cycle $\gamma$ of the chopper CH (the ratio of the current conducting time to the operating period of the chopper CH) has become the maximum value $\gamma_{max}$ and the electric car has reached substantially the rated speed, the switches $US_1$ and $US_2$ are closed to construct the shunt motor in order to render the speed of the electric car still higher. When the field coil F is of the shunt winding connection, the duty cycle $\gamma$ of the chopper CH connected in series with the field coil F is controlled so that the field current $I_F$ may become small as compared with the armature current $I_A$. Thus, the weak field control at the powering drive is executed.

At the shunt winding connection at which the switches $US_1$ and $US_2$ are closed, a series circuit consisting of the field coil F of the motor and the smoothing reactor MSL is directly connected to the overhead line through the chopper. In general, in the electric car, the resistance $R_{FO}$ of the series circuit consisting of the field coil F of the motor and the smoothing reactor MSL is a very small value (0.1–0.2Ω). In order to maintain the field current $I_F$ at a value until then (a value at the series winding connection), therefore, also the duty cycle $\gamma$ of the chopper CH need be made a small value.

As previously stated, however, the change-over from the series winding connection to the shunt winding connection is done upon sensing the fact that the duty cycle $\gamma$ of the chopper CH has become the maximum value $\gamma_{max}$. For this reason, there has occurred the problem that when the shunt winding connection is established under the state described above, the transient change of the field current $I_F$ becomes large to cause a sharp and sudden change of torque. In this invention, the problem is solved by carrying out a control as set forth below.

Figure 2A:
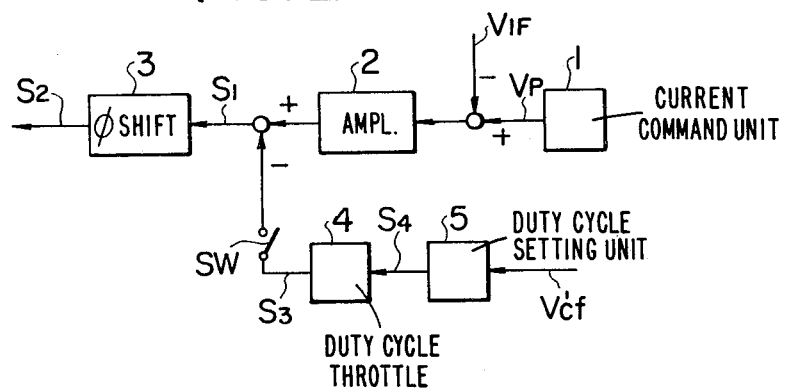
FIGS. 2A and 2B are diagrams showing an embodiment of a control circuit according to this invention.

FIG. 2A shows a control circuit of an embodiment of this invention. It is a current control system in which the field current $I_F$ (equal to the armature current $I_A$ at the series winding connection) is controlled by the chopper CH. The deviation between a current command value $V_P$ given by a current command unit 1 and a detected value $V_{IF}$ of the field current $I_F$ is supplied through a comparator and amplifier portion 2 to a phase shifter 3. Using a phase shift control output $S_2$ of the phase shifter 3, the duty cycle $\gamma$ of the chopper CH is controlled so as to attain a predetermined field current. When, in the case where the switches $US_1$ and $US_2$ in FIG. 1 are open to construct the series winding motor, the duty cycle $\gamma$ of the chopper CH has become the maximum value $\gamma_{max}$, and the switches $US_1$ and $US_2$ are then closed, the input voltage $S_1$ of the phase shifter 3 is throttled simultaneously by an output voltage $S_3$ (illustrated in FIG. 2B) of a duty cycle throttling unit 4. The moment the field coil F of the motor has become the shunt winding connection, the duty cycle $\gamma$ of the chopper CH is made small. The output voltage $S_3$ of the duty cycle throttling unit 4 is attenuated with the lapse of time, to suppress the transient change of the field current $I_F$.

By merely throttling the duty cycle of the chopper CH at the change-over, however, problems to be described below will occur since the running state of the electric car is not considered. The first problem is attributed to the fact that a filter capacitor voltage $V_{cf}$ in FIG. 1 fluctuates according to the overhead line voltage $V_s$ and that the fluctuating width becomes as great as 1500 V±20% in a feeder section in which power-driven cars and regeneratively-driven cars coexist. More specifically, the field current $I_F$ in the case where the field coil F of the motor has been put into the shunt winding connection is $I_F = (V_{cf} \times \gamma / R_{FO})$. Let it be supposed by way of example that, in the circuit of FIG. 2A, the maximum value $(S_3)_{max}$ of the output voltage $S_3$ of the duty cycle throttling unit 4 is set with reference to a case where the filter capacitor voltage $V_{cf}$ is 1500 V. Then, the field current $I_F$ immediately after the field coil F of the motor has been put into the shunt winding connection undergoes transiently a current change of ±20% at some value of the filter capacitor voltage $V_{cf}$. The second problem is attributed to the fact that the current command value $V_P$ is greatly different in dependence on the number of passengers in the electric car, i.e., on whether the car is empty or full. The current command value of a full car reaches about 200% with respect to that of an empty car. Assume by way of example that the maximum value $(S_3)_{max}$ of the output voltage $S_3$ of the duty cycle throttling unit 4 is set with reference to a current command value which is just the middle between those of the empty car and the full car. Then, the field current $I_F$ immediately after the field coil F of the motor has been put into the shunt winding connection undergoes transiently as large a current change as about ±30%.

In order to solve this problem is a duty cycle setting unit 5 is provided as shown in FIG. 2A which sets a duty cycle obtained in correspondence with the detected value $V_{cf}'$ of the voltage $V_{cf}$ of the filter capacitor $C_f$ immediately before the closure of the switches $US_1$ and $US_2$. The output of the duty cycle setting circuit 5 is given to the duty cycle throttling unit 4, and the throttling of the duty cycle of the chopper CH is carried out according to the voltage $V_{cf}$ (a value according to the running state of the electric car) of the filter capacitor $C_f$.

The function of the duty cycle setting unit 5 will be described more in detail.

When the duty cycle $\gamma$ of the chopper CH has become the maximum value $\gamma_{max}$ and the electric car has reached substantially the rated speed, the switches $US_1$ and $US_2$ in FIG. 1 are closed, and simultaneously, a switch SW (in which an interlocking contact of the switches $US_1$ and $US_2$ is utilized) is closed, to throttle the input voltage $S_1$ of the phase shifter 3 by the output voltage $S_3$ of the duty cycle throttling unit 4 and to throttle the duty cycle $\gamma$ of the chopper CH. The output voltage $(S_3)_{max}$ of the duty cycle throttling unit 4 at the instant of the closure of the switch SW, i.e., at a time $t_o$ is set by the output voltage $S_4$ of the duty cycle setting unit 5 as obtained in correspondence with the detected value $V_{cf}'$ of the filter capacitor voltage $V_{cf}$ immediately before the closure of the switches $US_1$ and $US_2$ in FIG. 1. The output characteristic of the duty cycle setting unit 5 is evaluated as stated below. In a circuit of FIG. 3 in which the field coil F is in the shunt winding connection, the field current $I_F$ becomes $I_F = (V_{cf} \times \gamma / R_{FO})$ where $R_{FO}$ denotes the internal resistance of the field coil F and the smoothing reactor MSL. The duty cycle $\gamma$ for maintaining the field current $I_F$ at the value before the closure of the switches $US_1$ and $US_2$ becomes $\gamma = (I_F \times R_{FO}/V_{cf})$, which is a characteristic inversely proportional to the filter capacitor voltage $V_{cf}$. Since the fluctuation of the overhead line voltage $V_s$ is about 1500 V±20%, the output characteristic of the duty cycle setting unit 5 may cover this range.

Figure 4:
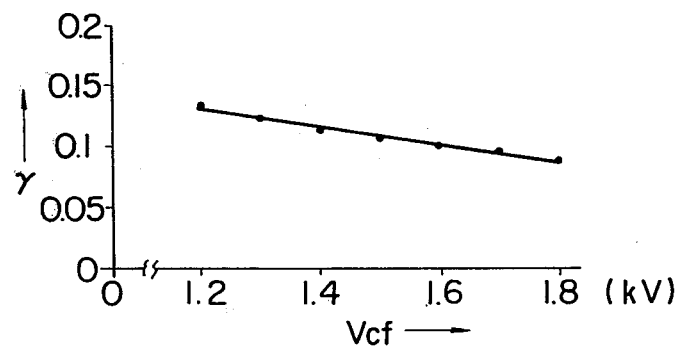
Figure 5:
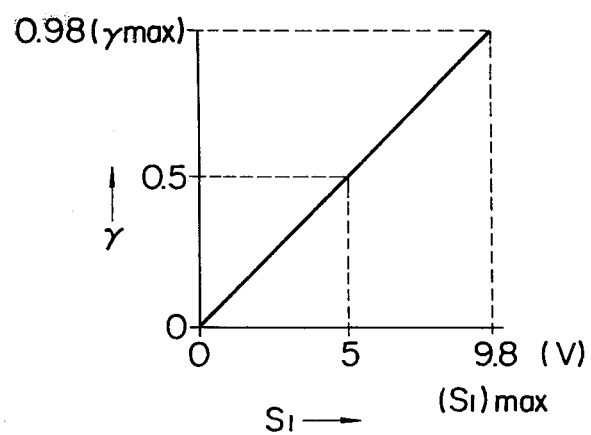
Figure 6:
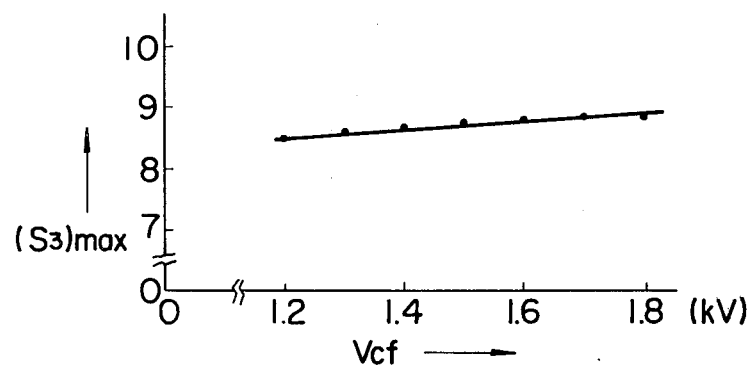

The output characteristic of the duty cycle setting unit 5 will now be given for an actual example of circuit. Supposing that the field current $I_F$ (equal to the armature current $I_A$) before the closure of the switches $US_1$ and $US_2$ (at the time when the field coil F is of the series winding connection) is 800 A and that the internal resistance $R_{FO}$ of the field coil F and the smoothing reactor MSL is 0.2 Ω, the output characteristic of the duty cycle setting unit 5 at filter capacitor voltages $V_{cf}$ of from 1200 V to 1800 V is represented as shown in FIG. 4. It is understood from the figure that the duty cycle $\gamma$ of the chopper CH may be substantially a linear characteristic versus the filter capacitor voltage $V_{cf}$ or detected value $V_{cf}'$. Since the duty cycle $\gamma$ is proportional to the input voltage $S_1$ of the phase shifter 3 shown in FIG. 2A, the output characteristic of the duty cycle setting unit 5 in FIG. 4 is made a voltage characteristic calculated in terms of the input voltage $S_1$ of the phase shifter 3 corresponding to the duty cycle $\gamma$. The maximum value $(S_3)_{max}$ of the output voltage $S_3$ of the duty cycle throttling unit 4 is obtained by subtracting the output voltage $S_4$ of the duty cycle setting unit 5 from the input voltage $(S_1)_{max}$ of the phase shifter 3 which gives the maximum vvalue $\gamma_{max}$ of the duty cyle $\gamma$ of the chopper CH. By way of example, the characteristic of the phase shifter 3 is so assumed that the duty cycle $\gamma$ of the chopper CH changes by 0.1 due to a change of the input voltage $S_1 = 1$ V as illustrated in FIG. 5. As an example a case, is assumed where the maximum duty cycle $\gamma_{max}$ of the chopper CH is 0.98. The input voltage $(S_1)_{max}$ of the phase shifter 3 which gives $\gamma_{max}=0.98$ becomes 9.8 V. On the other hand, the output voltage $S_4$ of the duty cycle setting unit 5 at the filter capacitor voltage $V_{cf}=1600$ V is 1 V corresponding to the duty cycle $\gamma=0.1$ (refer to FIG. 4). Consequently, the maximum value $(S_3)_{max}$ of the output voltage $S_3$ of the duty cycle throttling unit 4 may b made $(S_3)_{max}=9.8$ V $-1$ V $=8.8$ V. The maximum output voltage $(S_3)_{max}$ of the duty cycle throttling unit 4 versus the filter capacitor voltage $V_{cf}$ as thus evaluated is illustrated in FIG. 6.

When the switches $US_1$ and $US_2$ in FIG. 1 have been closed to complete the change-over control of the field coil F of the motor, the output voltage $S_3$ of the duty cycle throttling unit 4 decays gradually with lapse of time, and the control of the field current $I_F$ responsive to the current command value $V_p$ of the current command unit 1 is carried out.

According to the above embodiment of this invention, the throttling of the duty cycle of the chopper CH is done in response to the filter capacitor voltage $V_{cf}$ immediately before the closure of the switches $US_1$ and $US_2$ in FIG. 1, and hence, there is the effect that the transient change of the current immediately after the closure of the switches $US_1$ and $US_2$ is suppressed.

When the characteristic of the duty cycle setting unit 5 is set with the detected value of the overhead line voltage $V_s$ instead of the filter capacitor voltage $V_{cf}$, the function and effect are equivalent.

Figure 2B:
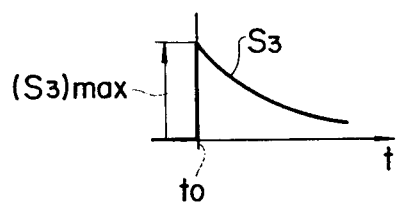
Figure 3:
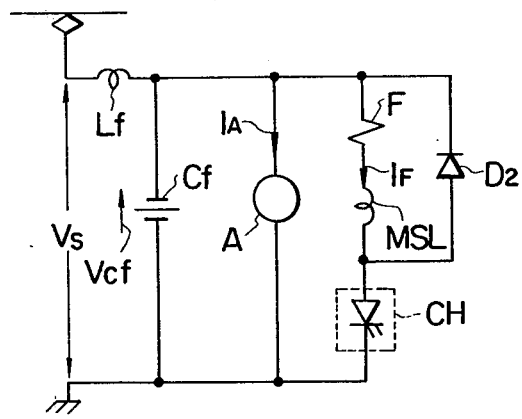
FIGS. 3 to 6 are diagrams for explaining the operation of the embodiment in FIG. 2A.
Figure 7:
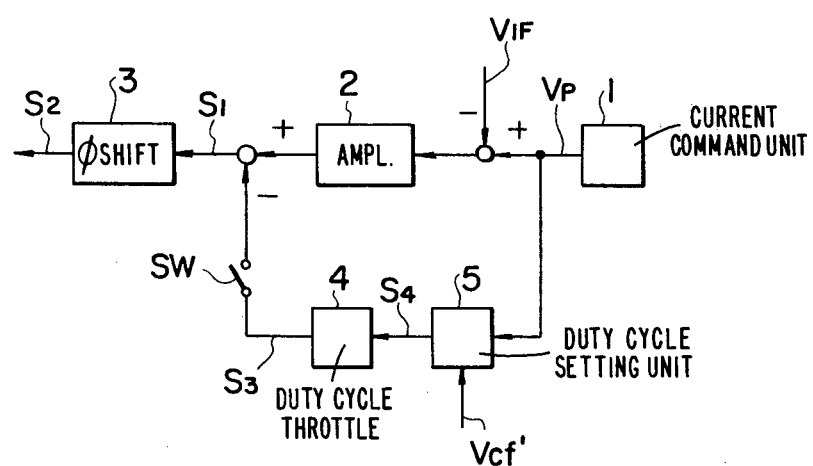
FIG. 7 is a diagram showing another embodiment of the control circuit according to this invention.
Figure 8:
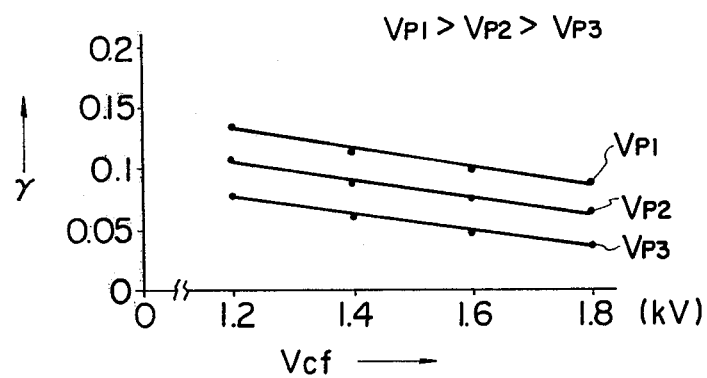
FIGS. 8 and 9 are diagrams for explaining the operation of the embodiment in FIG. 7.
Figure 9:
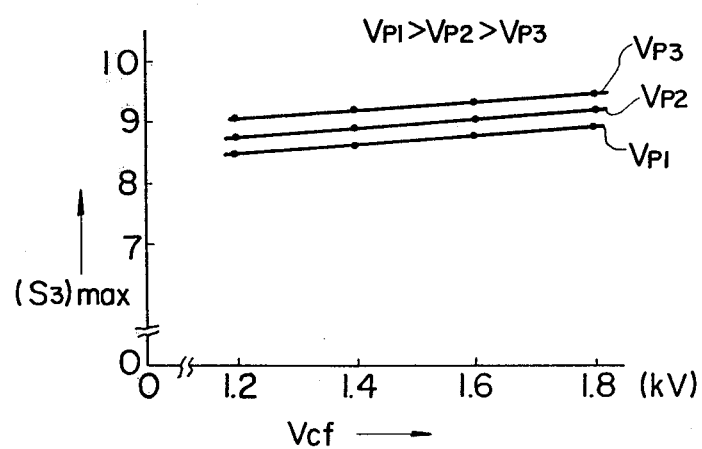

FIG. 7 shows another embodiment of this invention to cope with fluctuations in the overhead line voltage and the current command value. In the figure, the same parts as in FIG. 2A are indicated by the same symbols and reference numerals. Different from the previous embodiment in FIGS. 2A and 2B is that the output voltage $S_4$ of the duty cycle setting unit 5 is made a characteristic of the throttling duty cycle of the chopper CH corresponding to the detected value $V_{cf}'$ of the filter capacitor voltage $V_{cf}$ (voltage value corresponding to the input voltage $S_1$ of the phase shifter 3) with the current command value $V_p$ of the current command unit 1 being the parameter. As to the case where the internal resistance of the field coil F and the smoothing reactor MSL in FIG. 3 is $R_{FO}=0.2$ Ω, the output characteristic of the duty cycle setting unit 5 is shown in FIG. 8, and that of the duty cycle throttling unit 4 is shown in FIG. 9. In FIGS. 8 and 9, the current command values $V_p$ are $V_{p1}=800$ A, $V_{p2}=600$ A and $V_{p3}=400$ A. In accordance with the embodiment of FIG. 7, in case of changing the current command value $V_p$ in the full field control in which the switches $US_1$ and $US_2$ in FIG. 1 are not closed, the quantity of duty cycle throttling of the chopper CH in response to the current command value $V_p$ and the filter capacitor voltage $V_{cf}$ is obtained. Accordingly, there is the effect that the transient change of the field current $I_F$ between before and after the closure of the switches $US_1$ and $US_2$ can be suppressed.

Although, in the foregoing embodiments of this invention in FIG. 2A and FIG. 7, description has been made of the case of giving onto the input side of the phase shifter 3 the voltage $S_3$ for throttling the duty cycle of the chopper CH, the voltage may be given to the meeting point between the current command value $V_p$ and the detected value $V_{IF}$ of the field current $I_F$. Of course, in this case, a duty cycle throttling voltage with the constant of the comparator and amplifier portion 2 taken into consideration need be used. This measure is effective for application to, e.g., a magnetic phase shifter having both the functions of the comparator and amplifier portion 2 and the phase shifter 3.

In the foregoing embodiments, there have been described the functional effects of this invention against the fluctuation of the overhead line voltage or those of the overhead line voltage and the current command value. Of course, however, this invention is applicable to only the current command value as regards, for example, a battery-operated car in which the supply voltage fluctuates little and only the current command value fluctuates in dependence on the load.

Further, although in the foregoing embodiments the voltage for forcibly throttling the chopper duty cycle has been given at the change-over of the field coil of the motor from the series winding connection to the shunt winding connection, a method to be stated below may be adopted as regards the throttling of the chopper duty cycle. When the chopper duty cycle $\gamma$ has become the maximum value $\gamma_{max}$ in the state of series winding connection, the "off" pulse of the chopper CH is extinguished. Then, the chopper CH falls into the perfect short-circuit state, and the field current $I_F$ becomes greater than the current command value $V_p$. Therefore, the chopper duty cycle $\gamma$ is automatically throttled down to the minimum duty cycle $\gamma_{min}$ by the current control system. As the motor speed rises, the field current $I_F$ becomes smaller than the current command value $V_p$, and the chopper duty cycle $\gamma$ begins to become greater than the minimum value $\gamma_{min}$ again. Accordingly, the chopper duty cycle $\gamma$ at this time is monitored and compared with the output of the chopper duty cycle setting unit 5 illustrated in FIG. 4 or FIG. 8, and when the values have become equal, the switches $US_1$ and $US_2$ are closed to effect the change-over to the shunt winding connection. Then, likewise to the foregoing case of forcibly throttling the chopper duty cycle $\gamma$, the transient change of the field current $I_F$ can be suppressed.

Such an embodiment will now be described in detail.

Figure 10:
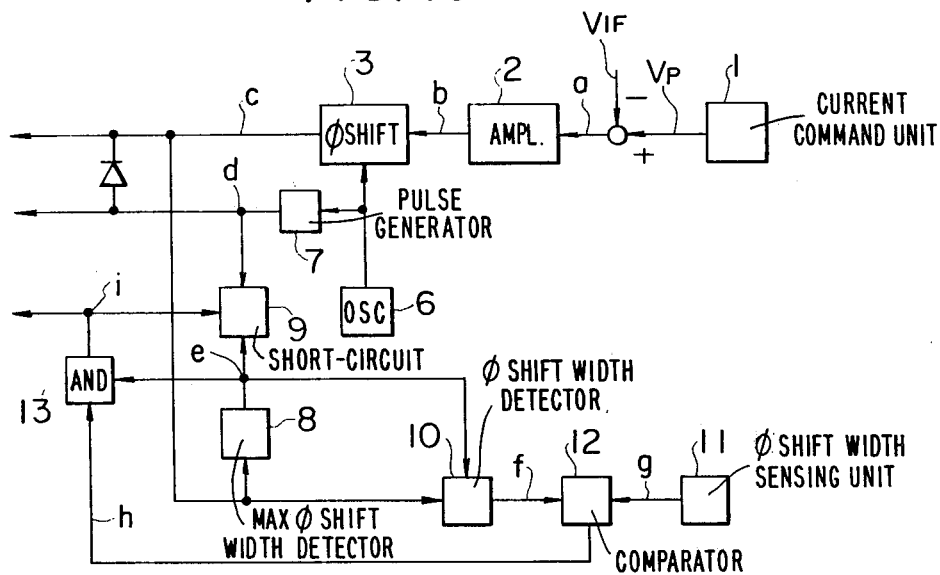
FIG. 10 is a diagram showing still another embodiment of the control circuit according to this invention.
Figure 11:
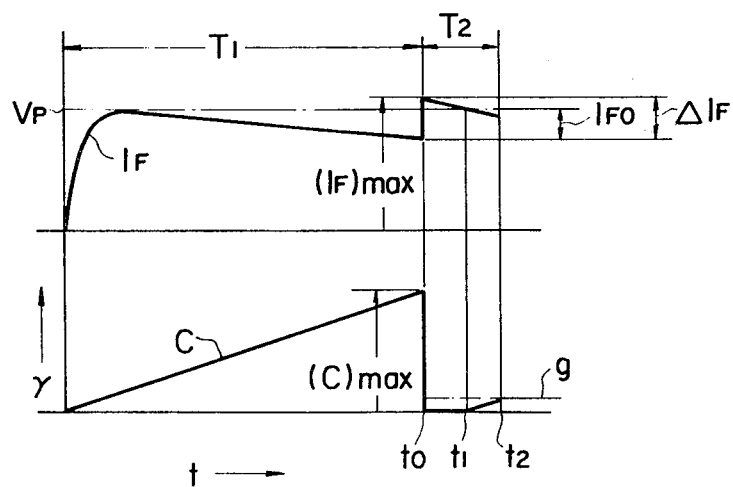
FIG. 11 is a diagram for explaining the operation of the embodiment in FIG. 10.

Referring to FIG. 10, the deviation a between the current command value $V_p$ of the current command unit 1 which gives the command of the field current $I_F$ at the full field control and the weak field control and the detected value $V_{IF}$ of the field current $I_F$ is made the input voltage b of the phase shifter 3 through the comparator and amplifier portion 2. The phase shifter 3 gives to the chopper CH an "on" pulse c phase-controlled with an oscillator 6 being made a power source. An "off" pulse generator 7 gives to the chopper CH an "off" pulse d synchronous with the oscillator 6. When a thyristor chopper is taken as an example, the "on" pulse c is given to a main thyristor to render the chopper CH conductive, and the "off" pulse d is given to the main thyristor and an auxiliary thyristor to render the chopper CH non-conductive. From the starting of the electric car to substantially the rated speed, the switches $US_1$ and $US_2$ shown in FIG. 1 are held open to construct the series motor, and the full field control is conducted by the chopper CH. In the full field control, the field current $I_F$ (equal to the armature current $I_A$) is made constant with the current command value $V_p$ kept constant. Therefore, as the motor voltage $V_M$ rises, the duty cycle $\gamma$ of the chopper CH or the phase shift width of the "on" pulse c of the phase shifter 3 becomes great. The variations of the field current $I_F$ and the phase shift width of the "on" pulse c are illustrated in FIG. 11. When the electric car has reached substantially the rated speed under the full field control (period $T_1$), the phase shift width of the "on" pulse c of the phase shifter 3 becomes a value $(C)_{max}$ corresponding to the maximum chopper duty cycle $\gamma_{max}$, and the phase shift width $(C)_{max}$ is sensed by a maximum phase shift width detector 8. The maximum phase shift width detector 8 (a time $t_0$ in FIG. 11) provides an output e, to operate an "off" pulse short-circuiter 9 of the chopper CH. Since the "off" pulse short-circuiter 9 short-circuits the "off" pulse d, the "off" pulse d is not applied to the chopper CH, and the chopper CH falls into the perfect conductive state (period $T_2$), that is, the so-called chopper short-circuit is established. The voltage change at the time when the chopper CH has become the chopper short-circuit from the maximum duty cycle $\gamma_{max}$ is $V_{cf} \times (1 - \gamma_{max})$ where $V_{cf}$ denotes the overhead line voltage. Therefore, letting $R_o$ denote the resistance value of a series circuit consisting of the armature A, field coil F and smoothing reactor MSL, a variation $\Delta I_F$ in the field current $I_F$ becomes $(V_{cf} \times (1 - \gamma_{max}))/R_o$.

That is, the field current $I_F$ increases by $\Delta I_F$ with respect to its value at the time of the maximum chopper duty cycle $\gamma_{max}$, and it becomes $(I_F)_{max}$ in FIG. 11. To take an actual circuit as an example, $V_{cf} \approx 1500$ V, $\gamma_{max} \approx 0.98$ and $R_o \approx 0.4$, and hence, $\Delta I_F \approx 75$ A. As illustrated in FIG. 11, the field current $I_F$ immediately before the chopper short-circuit is smaller by an offset error component $I_{FO}$ as compared with the current command value $V_p$. Therefore, assuming now that the current command value $V_p = 500$ A and that the offset error component $I_{FO} = 50$ A, the field current $(I_F)_{max}$ immediately after the chopper short-circuit becomes 525 A, which is slightly larger than the current command value $V_p$. As the result, the deviation a between the current command value $V_p$ and the detected value $V_{IF}$ of the field current $I_F$ becomes smaller than zero, so that the phase shifter 3 does not provide the "on" pulse c. After the chopper short-circuit, the field current $I_F$ gradually decreases from $(I_F)_{max}$ with the increase of the motor voltage. When it has become smaller than the current command value $V_p$ at a time $t_1$, the phase shifter 3 comes to provide the "on" pulse c again. Since a phase shift width detector 10 is put into an operable state by the output e of the maximum phase shift width detector 8, the phase shift width detector 10 senses the phase shift width of the "on" pulse c at the chopper short-circuit and supplies its output f as one input of a comparator 12. The other input of the comparator 12 is endowed with a set value g from a phase shift width setting unit 11 which presets a phase shift width of the "on" pulse c corresponding to the chopper duty cycle $\gamma$ at which, when the field coil F of the motor has changed-over from the series winding connection to the shunt winding connection, the field current $I_F$ becomes substantially equal to its value before the change-over. Letting $R_{FO}$ denote the internal resistance of the field coil F and the smoothing reactor MSL, the chopper duty cycle for making the field current the value $I_F$ at the series winding connection becomes $\gamma = (I_F \times R_{FO}/V_{cf})$, and hence, the characteristic of the phase shift width setting unit 11 is this chopper duty cycle as calculated in terms of the phase shift width of the "on" pulse c. When the output f of the phase shift width detector 10 has become equal to the set value g of the phase shift width setting unit 11 (a time $t_2$ in FIG. 11), the comparator 12 provides an output h, which is given to an AND gate 13. Since the other input of the AND gate 13 stores the output e of the maximum phase shift width detector 8, the AND gate 13 provides an output i. The output i of the AND gate 13 becomes a closure command for the switches $US_1$ and $US_2$ in FIG. 1 and an "off" pulse short-circuit release command of the "off" pulse short-circuiter 9 for releasing the chopper short-circuit. As the result, the field coil F of the motor is changed-over to the shunt winding connection, and the chopper CH commences the chopping operation again by the "on" pulse c and the "off" pulse d. Since the phase shift width of the "on" pulse c at this time is equal to the set value g of the phase shift setting unit 11, the field current $I_F$ is maintained at a value substantially equal to that at the time when the field coil F is in the series winding connection.

According to the above embodiment, no separate device for throttling the chopper duty cycle $\gamma$ is necessary. Besides, before the closure of the switches $US_1$ and $US_2$ in FIG. 1, the chopper duty cycle $\gamma$ required after the closure can be reliably set. Therefore, the embodiment achieves the effect that the transient change of the field current $I_F$ at the time when the switches $US_1$ and $US_2$ have been closed can be suppressed.

Figure 12:
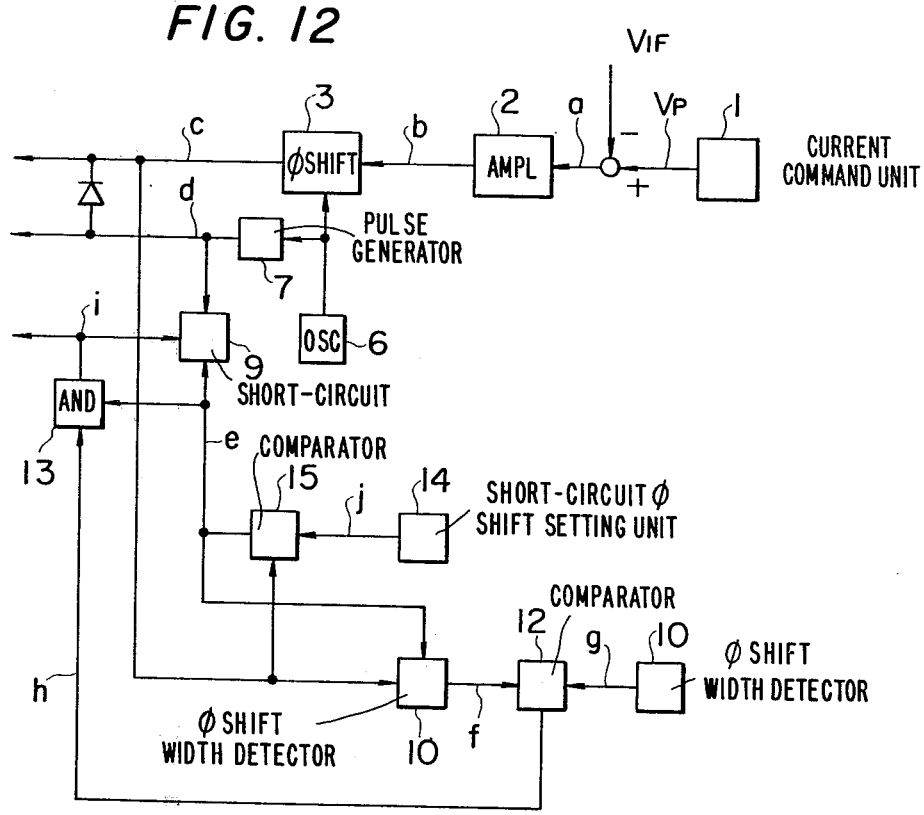
FIG. 12 is a diagram showing yet another embodiment of the control circuit according to this invention.
Figure 13:
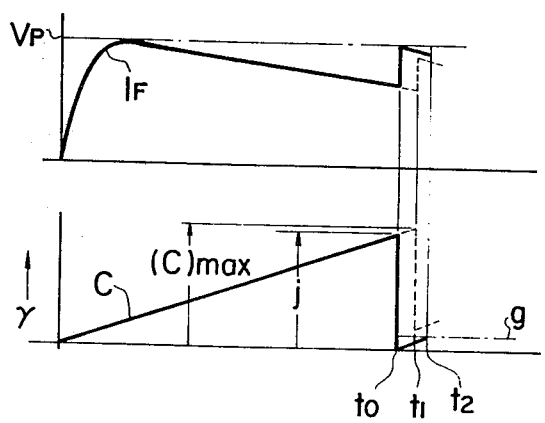
FIG. 13 is a diagram for explaining the operation of the embodiment in FIG. 12.

FIG. 12 shows another embodiment of this invention, in which the same parts as in FIG. 10 are indicated by the same symbols. The embodiment in FIG. 10 has been explained as to the case where the chopper short-circuit is established by the controllable maximum chopper duty cycle $\gamma_{max}$, whereby the field current $I_F$ becomes greater than the current command value $V_p$. However, in case where the number of series components of the motor increases and the resistance value $R_o$ of the circuit becomes high, or where the offset error $I_{FO}$ of the field current $I_F$ is great, when the chopper is short-circuited from the maximum chopper duty cycle $\gamma_{max}$, the field current $I_F$ does not always become greater than the current command value $V_p$, and hence, it sometimes occurs that the phase shift width of the "on" pulse c does not become smaller than the set value g of the phase shift width setting unit 11. To take as an example the case where the offset error $I_{FO}$ of the field current $I_F$ is great as in FIG. 13, when the chopper short-circuited is operated by the "on" pulse $(C)_{max}$ corresponding to the maximum chopper duty cycle $\gamma_{max}$ as indicated by a dotted line (time $t_1$), the field current $I_F$ is smaller than the current command value $V_p$, and the phase shift width of the "on" pulse is greater than the set value g of the phase shift width setting unit 11. In consequence, immediately after the chopper short-circuit, the shunt winding connection of the field coil F (the closure of the switches $US_1$ and $US_2$) and the release of the chopper short-circuit are carried out, and the field current $I_F$ increases sharply.

According to the embodiment of FIG. 12, the short-circuit of the chopper is done before the duty cycle of the chopper becomes the controllable maximum duty cycle $\gamma_{max}$. A phase shift width at which the phase shift width of the "on" pulse c becomes smaller than the set value g of the phase shift width setting unit 11 after the chopper short-circuit is set by a short-circuit phase shift width setting unit 14 beforehand. The output j of the unit 14 is made one input of a comparator 15. As the other input of the comparator 15, the phase shift width of the "on" pulse c is detected. Thus, the comparator 15 provides an output e when the output j of the short-circuit phase shift width setting unit 14 has become equal to the phase shift width of the "on" pulse c. The output e operates the "off" pulse short-circuiter 9, and short-circuits the "off" pulse d to bring the chopper into the short-circuited state. After the chopper short-circuit, the function is the same as in the embodiment of FIG. 10, and the same effect can be achieved.

Although, in the embodiments of FIG. 10 and FIG. 12, description has been made of the case where the phase shift width is detected by the "on" pulse c of the phase shifter 3, the function and effect are equivalent even when the phase shift width is detected by the input voltage b of the phase shifter 3, because the phase shift width of the "on" pulse c is proportional to the input voltage b of the phase shifter 3. Further, although in the explanation of the embodiment of FIG. 12 it has been supposed that the field current $I_F$ involves the offset error dependent on the gain of the current control system, the embodiment of FIG. 10 which always performs the chopper short-circuit by sensing the maximum duty cycle of the chopper can be meritoriously adopted by compensating for the offset by such method as positively feeding the offset error back to the current control system.

In accordance with this invention, whenever the field coil of the motor is changed-over from the series winding connection to the shunt winding connection, the optimum chopper control is performed, whereby the transient change of the current between before and after the changeover can be reliably suppressed.

We claim:

1. In an electric car comprising:
   a power source;
   a motor including a field coil and an armature winding;
   a smoothing reactor which smooths a current flowing through the motor;
   a chopper which controls the current flowing through the motor;
   a freewheel rectifier which, at the on-off control of the chopper, circulates energy accumulated in the smoothing reactor;
   a short-circuit checking device which checks a short-circuit of a motor voltage and which is interposed between the armature and the field coil of the motor;
   first means for short-circuiting the field coil of the motor, the smoothing reactor and the chopper through the short-circuit checking device;
   second means for short-circuiting the armature of the motor through the short-circuit checking device;
   a current control system which controls the current of the motor to a value responsive to a current command;
   means for detecting changes in running states of the electric car, including changes in the voltage of said power source and changes in said current command and producing a detected signal indicative of said running state; and
   means for controlling a field current of said motor in response to the detected signal indicative of said running states of the electric car to maintain the field current at substantially the same level before and after the operations of said first and second means.

2. The control apparatus for an electric car as defined in claim 1, characterized in that the control of the field current is executed by controlling a duty cycle of said chopper and that the duty cycle of said chopper is set according to the supply voltage.

3. The control apparatus for an electric car as defined in claim 1, characterized in that the control of the field current is executed by controlling a duty cycle of said chopper and that the duty cycle of said chopper is set according to the current command.

4. The control apparatus for an electric car as defined in claim 1, characterized in that the control of the field current is executed by controlling a duty cycle of said chopper and that the duty cycle of said chopper is set according to the supply voltage and the current command.

5. The control apparatus for an electric car as defined in claim 1, characterized in that the control of the field current short-circuits and controls said chopper, whereupon said first and second means are operated.

6. The control apparatus for an electric car as defined in claim 5, characterized in that the short-circuit control of said chopper is operated by extinguishing an "off" pulse which is applied to said chopper.

7. The control apparatus for an electric car as defined in claim 5, characterized in that the short-circuit control of said chopper is performed upon arrival at a duty cycle at which the field current after the short-circuit becomes greater than the current command.

8. The control apparatus for an electric car as defined in claim 5, characterized in that the operations of said first and second means are performed when a phase shift width of an "off" pulse which is applied to said chopper has achieved at a predetermined value.

9. A control apparatus for an electric car comprising:
   (a) a motor for driving the electric car, including a field coil and an armature winding;
   (b) a power source for supplying an electric power to the motor through a pair of lines;
   (c) switching means for changing over the field coil between a series connection mode and a shunt connection mode with respect to the armature winding of the motor so that the motor operates as one of a series motor and a shunt motor depending upon the condition of the switching;
   (d) means for producing an instruction signal indicative of a level desirable for the field current to be maintained;
   (e) means for changing an average current flowing through the field coil in response to the instruction signal;
   (f) means for detecting changes in running conditions of the electric car, including at least one of a change in the voltage across the pair of lines and a change in the instruction signal and producing a detected signal indicative of said running state; and
   (g) a control means adapted to receive the detected signal indicative of changes in the running conditions of the electric car, for controlling the field current to remain substantially the same before and after the switching-over from the series connection mode to the shunt connection mode.

10. A control apparatus for an electric car as defined in claim 9, which further comprises a chopper connected in series with the field coil, the duty cycle of the chopper being controlled in response to the detected signal indicative of changes in the running conditions of the electric car so as to maintain the average field current at substandilly the same level before and after the switching-over from the series connection mode to the shunt connection mode.

11. A control apparatus for an electric car as defined in claim 9, which further comprises a chopper connected in series with the field coil and means for short-circuiting said chopper before the changing-over from the series connection mode to the shunt connection mode.

12. A control apparatus for an electric car comprising:
 (a) a motor for driving the electric car, including a field coil and an armature winding;
 (b) a power source for supplying an electric power to the motor through a pair of lines;
 (c) a filter means connected across the pair of lines for smoothing an armature current flowing from the power source through the armature winding of the motor;
 (d) a chopper means connected in series with the field coil of the motor for chopping the field current flowing through the field coil, a duty cycle of the chopper being varied depending upon a control signal to be applied at a control electrode of the chopper;
 (e) switching means for changing over the field coil between a series connection mode and a shunt connection mode with respect to the armature winding of the motor so that the motor operates as one of a series motor and a shunt motor in dependence on the condition of the switching;
 (f) a phase shifter means for shifting in phase the control signal to be applied to the chopper means in response to an input of the phase shifter so as to change the duty cycle of the chopping operation of the chopper means;
 (g) first means connected to the phase shifter for providing a signal to control the phase shifter output and thereby control the chopper duty cycle, wherein said signal has a maximum value at the time when the field coil is changed over from the series connection to shunt connection mode with respect to the armature of the motor and becomes gradually lower in level with time; and
 (h) second means connected with the first means for producing a signal to change the maximum value of the signal produced by the first means in response to a fluctuation of a voltage across the pair of lines.

13. A control apparatus for an electric car as defined in claim 12, which further comprises third means for detecting a value of the field current flowing through the field coil when connected in series with the armature of the motor; fourth means for comparing the detected value of the field current with a current command value to produce a deviation therebetween; and fifth means for producing a deviation signal between outputs of the first means and the fourth means, which is applied to the phase shifter means.

14. A control apparatus for an electric car as defined in claim 12, wherein the first means controls the phase shifter output by throttling the input signal to the phase shifter.

15. A control apparatus for an electric car as defined in claim 12, wherein said filter includes a capacitor coupled across the pair of lines, and the second means includes means to determine the fluctuation of the capacitor voltage.

16. A control apparatus for an electric car comprising:
 (a) a motor for driving the electric car, including a field coil and an armature winding;
 (b) a power source for supplying an electric power to the motor through a pair of lines;
 (c) a filter means connected across the pair of lines for smoothing an armature current flowing from the power source through the armature winding of the motor;
 (d) a chopper means connected in series with the field coil of the motor for chopping the field current flowing through the field coil, a duty cycle of the chopper being varied depending upon a control signal to be applied at a control electrode of the chopper;
 (e) switching means for changing over the field coil between the series connection and shunt connection mode with respect to the armature winding of the motor so that the motor operates as one of a series motor and a shunt motor in dependence on the condition of the switching;
 (f) a phase shifter means for shifting in phase the control signal to be applied to the chopper means in response to an input of the phase shifter so as to change the duty cycle of the chopping operation of the chopper means;
 (g) first means connected with the phase shifter for providing a signal to control the phase shifter output and thereby the chopper duty cycle, wherein said signal has a maximum value at the time when the field coil is changed over from the series connection to shunt connection mode with respect to the armature winding of the motor and becomes gradually lower in level with time;
 (h) second means for detecting a fluctuation in a voltage across the pair of lines;
 (i) third means for generating a current command value which varies depending upon the number of passengers in the electric car; and
 (j) fourth means connected with the second and third means to receive outputs therefrom, for producing a signal to change the maximum value of the signal produced by the first means in correspondence with fluctuations in both the voltage across the pair of lines and the current command value.

17. A control apparatus for an electric car as defined in claim 16, which further comprises fifth means for detecting a value of the field current flowing through the field coil when connected in series with the armature winding of the motor; sixth means for comparing the detected value of the field current with the current command value to produce a deviation therebetween; and seventh means for producing a deviation signal between outputs of the first means and the sixth means which is applied to the phase shifter means.

* * * * *